July 6, 1965  O. R. MITTELMAN  3,193,406
EDGE REGULATOR
Filed Dec. 7, 1961  2 Sheets-Sheet 2
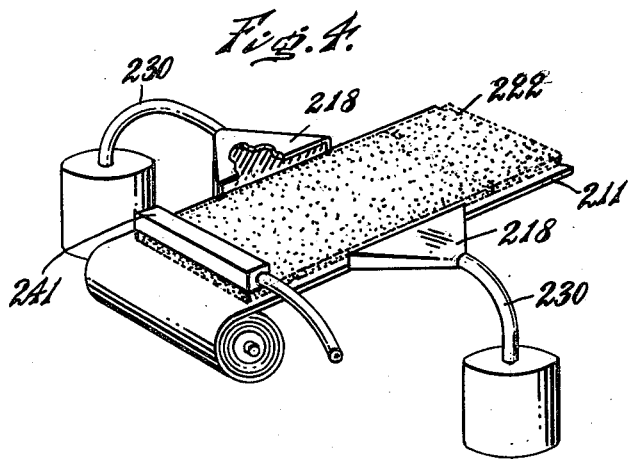
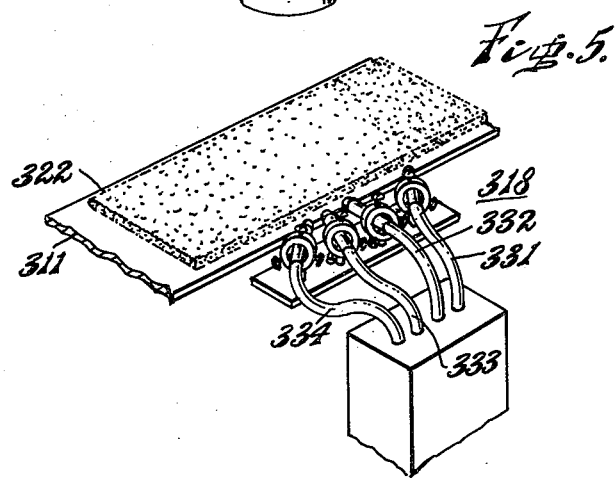
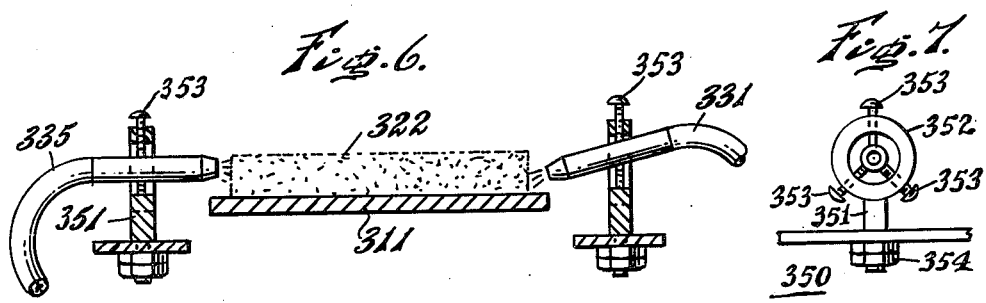
INVENTOR
Oscar R. Mittelman
BY John R. Ewbank
ATTORNEY United States Patent Office 3,193,406
Patented July 6, 1965

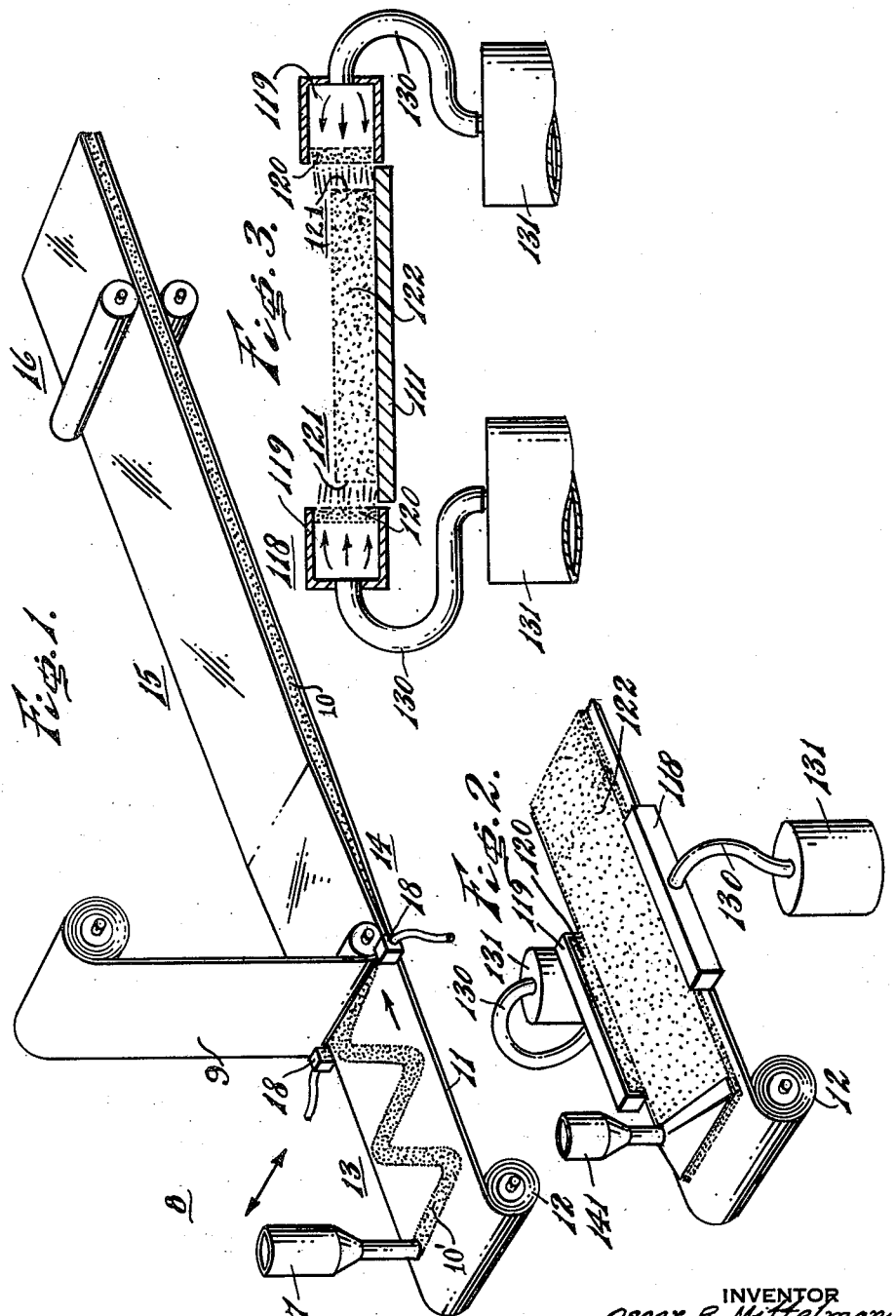

3,193,406
EDGE REGULATOR
Oscar R. Mittelman, Long Beach, N.Y., assignor, by mesne assignments, to Allied Chemical Corporation, New York, N.Y., a corporation of New York
Filed Dec. 7, 1961, Ser. No. 157,800
3 Claims. (Cl. 117—120)

This invention relates to methods and machines for coating sheet material with chemical compositions convertible to plastic foam and particularly to a method for regulating the edges of such coatings to maintain a product of uniform width.

Heretofore, one variety of machine for coating an advancing sheet of material with precursors for polyurethane foam has employed an applicator cmprising a reciprocating head depositing a small stream of coating material onto the advancing sheet material. The deposited material has readily flowed from the line of deposit to each adjacent line of deposit, whereby the wave-like path of deposition has been obscured. As the advancing sheet leaves the zone in which the coating material is deposited, it approaches and passes through a zone of excess coating material immediately before going through the metering zone. In the metering zone, the thickness of the coating is readjusted to bring the thickness of the coating within the predetermined range, and to eliminate any residual effect of the deposition of the coating material along the wavy path. Although the thickness of the plastic foam has been satisfactorily regulated in this manner, difficulties have been encountered in connection with the edges of the plastic foam. Thus, under some conditions the edges of the resulting plastic foam have tended to be somewhat scalloped. Coating material deposited from slots and devices other than reciprocating heads have also failed to attain the desired edge after the polyurethane foam-forming composition has foamed and solidified.

In accordance with the present invention, an edge portion of the coating on the advancing sheet is pneumatically restrained from flowing and/or pushed back toward the center line of the advancing sheet.

The invention is further clarified by reference to the accompanying drawing. FIG. 1 is a schematic view of a machine which the pneumatic edge regulators are fixed to control the width of the coating material before it passes through the metering zone. FIGURES 2 and 3 show schematic and partial views of a machine employing pneumatic edge regulators for a plastic froth. FIGURE 4 is a schematic view of a machine employing a diffuser type of pneumatic edge regulator. FIGURES 5, 6 and 7 are schematic, sectional, and partial end views of a machine employing multiple jets as an edge regulator.

As shown in FIGURE 1, a coating machine 8 includes means for advancing an upper sheet 9 onto a coating 10 of polyurethane-forming chamicals previously deposited as a liquid phase precursor 10' on a sheet material 11. The sheet material 11 advances from a supply roll 12 through a coating zone 13, a metering zone 14, a curing zone 15 and to a product withdrawal zone 16.

Polyurethane foam forming chemicals are deposited from a reciprocating applicator 17 to make a wavy path on the advancing sheet material 11. These polyurethane forming chemicals contain organic diisocyanate, water and a catalyst in addition to resinous hydroxy material, and have a lower viscosity when first mixed than after the chemicals have interacted. The coating composition, after passing through the metering zone 14, undergoes a creaming reaction and foam forming reaction until it rises to its predetermined thickness, and is cured in the curing zone 15. The thus established foam sandwich can be drawn through the machine so that the continuously produced sandwich strip is pushed into the product withdrawal zone 16. The previous disclosures of machines and methods for making polyurethane foam sandwiches are relied upon to supplement the description of this general arrangement of the environment for the invention.

Particular attention is directed toward an edge regulator 18 positioned at each side of the advancing strip 11 and adapted to direct a compressed air stream at the coating composition tending to flow beyond the predetermined limits. Because the compressed air restrains the flow of the coating composition without the coating composition touching any pneumatic regulating surfaces, it is not necessary to provide any continuous cleaning, as would be required for a doctor blade or other mechanical scraper at the edge of the advancing strip. Although the edge regulators 18 are shown schematically as acting on the coating composition just prior to its entry into the metering zone 14, one or more sets of pneumatic edge regulators may also be positioned at a series of positions between the metering zone 14 and the product withdrawal zone 16.

As shown in FIGURES 2 and 3, plastic froth is deposited from long slit-type of applicator 141 onto advancing sheet material 111. Any tendency for the froth to flow beyond its predetermined limits is restrained by the action of pneumatic edge regulators 118. A plenum chamber 119 in the edge regulator 118 is supplied with compressed air from tank 131 through a hose 130. The compressed air in the plenum chamber 119 diffuses through a porous plate 120, and is blown against an edge 121 of the coating 122 on the advancing sheet material 111. Thus the coating material is maintained within the predetermined limits with respect to the center line of the advancing sheet.

An edge regulator having a porous plate, and directing a gas stream along a significant length of the edge, as is shown schematically in FIG. 2, is the preferred form of pneumatic edge regulator. A plurality of the edge regulators may be positioned along each edge of a machine, and the use of only a single pair is a schematic representation.

In FIG. 4, an advancing sheet 211 receives a layer of coating material 222 which is cured into a plastic foam. An applicator 241 deposits the coating material within predetermined limits. An edge regulator 218 directs a compressed gas stream onto the edge of the coating material on the advancing sheet, whereby the edge is maintained at a predetermined distance from the center line of the advancing sheet. Compressed gas, such as compressed air, may be supplied to the edge regulator 218 through a hose 230. The edge regulator 218 has an open end instead of a porous plate, but is shaped to act as a diffuser for directing the gas stream along a significant length of the edge.

As shown in FIGURES 5, 6 and 7, a plurality of air jets may be directed toward the edge of coating material 322 on an advancing sheet 311. The edge regulator 318 comprises nozzles 350, each mounted for precise adjustment of the gas stream therefrom. A post 351 carries a ring 352 having three adjusting screws 353 positioning the nozzle. Further adjustment of the height may be provided through the adjusting nuts 354, and/or by mounting each nozzle in two mounting rings. Compressed gas is supplied to the nozzles through hoses 331, 332, 333, and 334. The flexibility of the multiple jet type of edge regulator is advantageous when the machine is employed for the production of many kinds of products each year.

In the operation of edge regulator of the present invention, the air stream from the pneumatic edge regulator is directed toward the edge of the coating material, such as plastic froth or a reactive mixture convertible into polyurethane foam, and the adverse flowing of the coating material beyond the predetermined limits is restrained. Because of the action of the pneumatic edge regulator, none of the coating material is deposited on the edge regulator, whereby the problems incident to the use of a doctor blade are avoided.

Many modifications are possible without departing from the concept of a pneumatic edge regulator in a machine for the production of strips of plastic foam, the drawings and description helping merely to illustrate the invention, which is defined to distinguish from prior art practices in the claims.

The invention claimed is:

1. A method for controlling the width of a coating of polyurethane forming chemicals deposited on a sheet material and advancing therewith along a path in which said coating is transformed from a deposit state into a cured plastic foam intimately bonded to said sheet material to form a composite of plastic foam and sheet material, which method includes the directing of a gas stream having a preselected velocity and direction towards an edge of the advancing coating, which gas stream effectively restrains the sidewise flow of said coating to maintain a predetermined width thereof with respect to the width of said sheet material.

2. A coating machine for the production of continuous strips of composite plastic foam and sheet material comprising: means for supplying an advancing sheet of material; an applicator for depositing onto the advancing sheet a predetermined thickness and width of coating material; means for curing the coating material into plastic foam; means for withdrawing said composite, and at least one pair of edge regulators positioned to direct gas streams toward respective edges of the coating material, whereby the width of the plastic foam is maintained within predetermined limits.

3. A machine in accordance with claim 2 in which each of said edge regulators comprises a porous plate through which the gas flows toward an edge of the coating material.

References Cited by the Examiner
UNITED STATES PATENTS 1,587,699   6/26   Daniels _____ 162—310
2,841,205   7/58   Bird.

EARL M. BERGERT, *Primary Examiner.*